Oct. 19, 1943.　　　　F. H. BOOR　　　　2,332,481
FISHING REEL
Filed Nov. 30, 1940　　　　7 Sheets-Sheet 2

INVENTOR.
FRANCIS H. BOOR
BY Woodling and Krost attys

Fig. 6

Oct. 19, 1943.                F. H. BOOR                2,332,481
                            FISHING REEL
              Filed Nov. 30, 1940           7 Sheets-Sheet 6

INVENTOR.
FRANCIS H. BOOR
BY

Oct. 19, 1943.                F. H. BOOR                2,332,481
                              FISHING REEL
                     Filed Nov. 30, 1940          7 Sheets-Sheet 7

Fig. 10

INVENTOR.
FRANCIS H. BOOR
Hoodling and Kraut attys

Patented Oct. 19, 1943

2,332,481

UNITED STATES PATENT OFFICE 2,332,481

FISHING REEL

Francis H. Boor, La Fayette, Ind., assignor to Rochester Baird

Application November 30, 1940, Serial No. 367,987

35 Claims. (Cl. 43—20)

My invention pertains to reels and more particularly to fishing reels adapted for playing and landing relatively large fish.

An object of my invention is to provide a reel having a novel mechanism for assuring that the line which is wound on the spool will lie in even layers thereby preventing back-lash and snarls when the line is rapidly wound or unwound.

Another object of my invention is to provide a level-wind mechanism which does not touch the fishing line in advance of the reel spool, thereby obviating a cause of many line-snarls.

A further object of my invention is to provide a level-wind mechanism which is adaptable for use with light reels for fresh and salt water fishing and which is also adaptable for use with large reels for catching large salt water fish.

Still another object of my invention is to provide a level-wind mechanism which has no moving bars, arms or eyes for guiding the incoming line.

A still further object of my invention is to provide a level-wind mechanism which is operable as the line is being wound on the reel spool but which is inoperable as the line is being unwound from the reel spool.

Another object of my invention is to provide a rod and reel mechanism in which part of the rod provides part of the mechanism for causing the reel to pivotally oscillate with respect to the rod to cause incoming line to be wound in even layers on the spool of the reel.

A further object of my invention is to provide a rod and reel mechanism in which the reel pivotally oscillates with respect to the rod as line is being wound on the reel but which does not pivotally oscillate with respect to the rod as line is being unwound therefrom.

Still another object of my invention is to provide a two-speed level-wind fishing reel in which the reel spool pivotally oscillates with respect to the rod on which it is mounted and to provide a power "break" between the winding handle and the reel spool to prevent the transmission of power therebetween under certain conditions.

Another object of my invention is to provide an eccentric connection between the driving means for the reel and the reel spool for pivotally oscillating the reel spool to cause the line being wound on the reel spool to be level-wound.

A further object of my invention is to provide an adjustable friction mechanism which regulates the rotation of a reel when the line is going out and which is adjustable by turning the top plate of the reel.

Another object of my invention is to provide an adjustment for regulating the amount of frictional application applied to the spool of a reel and to so position the adjustment that it can be changed while the fisherman has one of his hands on the handle of the reel.

Still another object of my invention is to provide a frictional brake mechanism and reel spool which turn on a first bearing when line is being wound on the spool and to cause the spool only to turn on a second bearing when line is being unwound from the spool.

Another object of my invention is to provide a fishing reel having friction means capable of turning the reel spool under certain conditions and capable of applying a braking action upon the reel spool under certain other conditions.

A further object of my invention is to provide a fishing reel having an adjustable frictional device which may be used as a frictional drive and which may be set to slip at any desired pull by a fish to allow line to be unwound from the reel, and to use said slipping adjustable frictional device as a drag or frictional brake on said reel.

Another object of my invention is to provide a fishing reel with a spool for winding the line thereon and to provide the spool with a plurality of winding speeds for the speed of the reel handle or crank.

A further object of my invention is to provide a reel having a gear shift lever which is adapted to regulate the speed of the spool with respect to the speed of the reel crank or handle.

Still another object of my invention is to provide a two-speed reeling device in which a gear used to drive the reel spool at a first speed actuates a level-wind mechanism, and in which a gear used to drive the reel spool at a second speed also drives the said first speed gear to cause said level-wind mechanism to operate in accord with the speed of the reel spool.

Another object of my invention is to provide a winding reel which pivotally oscillates with respect to the line being wound thereon to cause the line to wind in layers and to provide the reel with a gear mechanism of a plurality of gear speed arrangements for regulating the speed of the reel spool and to at all times regulate the speed of the pivotal oscillations of the reel with respect to the line by a gear which is common to all speeds.

A still further object of my invention is to provide a reel for winding line thereon which will allow the line to be unwound therefrom with very little frictional resistance.

Another object of my invention is to provide a fishing reel having a number of gears for regulating the speed of the reel spool with respect to the speed of the reel handle or crank and to provide a free spooling "throw off" device which disengages the spool from the gears and allows the spool to run substantially free from frictional resistance.

Still another object of my invention is to provide a geared reel which pivotally oscillates with respect to the line that is being wound thereon to cause the line to be wound level on the reel spool and to regulate the speed of the level-wind reel movement in accordance with the gear ratio between the winding handle or crank and the reel spool.

A further object of my invention is to attach a reel to a rod for pivotal-oscillating movements.

Another object of my invention is to pivot the wheel in a cradle attached to the rod to cause the incoming line to be wound on the reel spool in uniform layers.

Another object of my invention is to provide a reel spool which is driven by a winding handle to cause fishing line to be wound thereon and to provide means for "breaking" the power transmission from the winding handle to the reel spool to allow the reel spool to turn freely under the pull of a fish swimming away from the reel.

Other objects and a fuller understanding of my invention may be had by referring to the following description and claims, taken in conjunction with the accompanying drawings, in which:

With reference to the drawings my invention comprises a fishing reel 20 and a fishing rod handle 12 having a socket 11 into which a fishing rod 10 is adapted to be slidably attached.

Figures 1, 2:
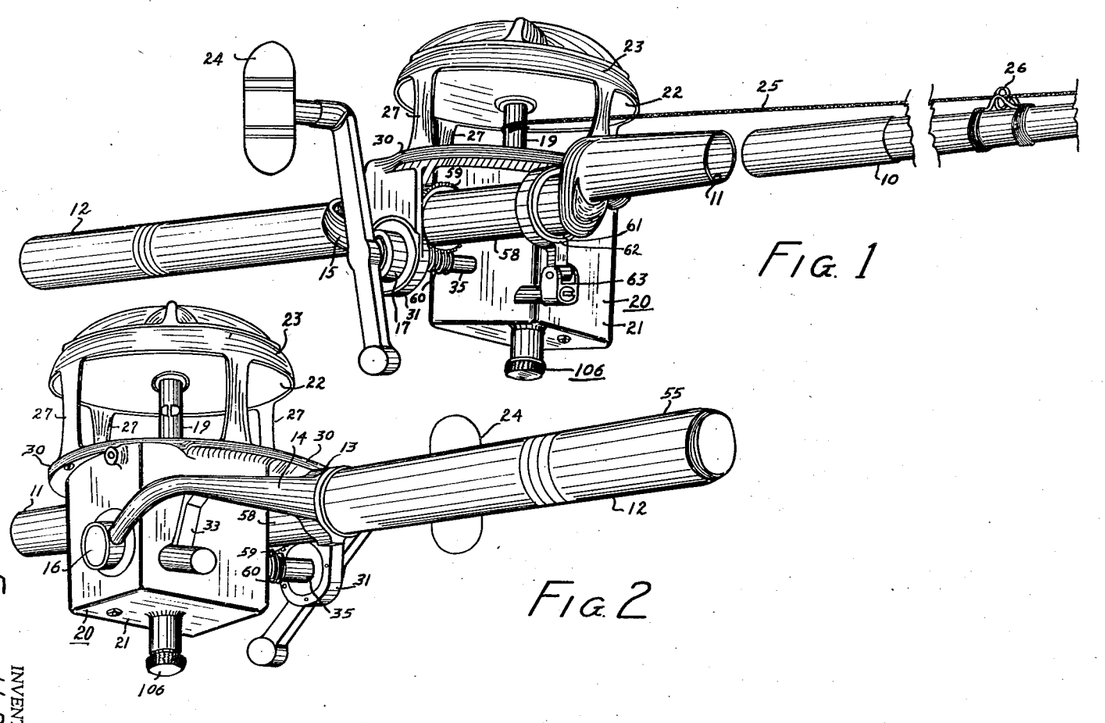
Figure 1 is a perspective view of my reel and rod assembly looking from a point in front, to one side, and slightly below the reel.
Figure 2 is another perspective view looking from a point behind, to one side, and slightly below the reel.

Connected to the rod handle 12 by means of a cradle mounting ring 13 are two cradle arms 14 and 15. Positioned between the two cradle arms 14 and 15 and pivotally attached to them by means of trunnions 16 and 17 is the reel indicated generally by the reference character 20 and comprising four main parts: the main gear housing 21, the reel spool 22, the frictional device housing 23, and the winding handle or crank 24. The reel spool 22 is positioned between the frictional device housing 23 and the main gear housing 21 and is adapted to rotate as the winding handle or crank 24 is turned. The rotation of the spool 22 causes the fishing line 25 to be pulled through the last guide 26 on the rod 10 and wound on the spool. The frictional device housing 23 is supported away from the main gear housing 21 by means of four legs 27 and a stationary plate 88. The line 25 does not touch the legs 27 and therefore passes from the guide 26 to the spool without touching any of the reel parts and without interference from moving guide eyes or bars to cause it to level-wind on the spool. The top portion of the main gear housing 21 is indicated by the reference character 30 and is enlarged to provide space for attaching the four supporting legs 27. The top portion 30 of the main gear housing is also enlarged to extend over the rod handle 12 as may be seen in Figure 1. A trunnion supporting leg 31 is integral with and extends downwardly from the top portion 30 of the main gear housing and provides support for the trunnion 17 which, together with the cradle arm 15, pivotally supports one side of the reel 20 from the rod handle 12. The other side of the reel 20 is pivotally supported from the rod handle 12 by means of the cradle arm 14 and the trunnion 16 which is connected to the main reel gear housing 21.

I have provided my reel spool 22 with two winding speeds for each speed of the winding handle or crank 24. This is accomplished by means of gears inside the main gear housing 21 and is controlled by a gear shift lever 33 extending through the outside of the main gear housing and adapted to be shifted by a slight push by the operator's or fisherman's finger. As may be best seen in Figures 5 and 10, when the operator turns the winding handle 24 the torque is transmitted to the solid drive shaft 34 positioned inside the hollow worm pinion shaft 35 and which is adapted to turn with respect to the worm pinion shaft. A bearing 28 is provided adjacent the trunnion 17 to support the handle end of the solid shaft 34 and a bearing 29 is provided adjacent the trunnion 16 to support the other end of the solid shaft 34. The solid drive shaft 34 is keyed by means of a shaft key 36 or other similar means to a gear shift collar 37 which is longitudinally slidable with respect to the drive shaft 34 but which rotates as the drive shaft 34 rotates. The slidable gear shift collar 37 has two sides 38 and 39, each of which comprises a mating half of a jaw clutch. In the collar 37 and between the sides 38 and 39 there is a circumferential groove 40 into which a positioning shifting finger 41 fits. The positioning finger 41 is slidably positioned on a supporting shaft 42. Slidably positioned around the supporting shaft 42 and placed against opposite sides of the positioning finger 41 are two springs 43 and 44. The right hand spring 44 is constrained between the positioning finger 41 and a washer 45 which is braced against a pin 46 through the supporting shaft 42. The left hand spring 43 is constrained between the positioning finger 41 and a collar 47 around the supporting shaft 42. The collar 47 is slidable with respect to the supporting shaft 42 and may be actuated back and forth on the supporting shaft by means of the bifurcated lever 48 which engages the pin 49 in the collar 47 and which turns as shaft 50 turns. The gear shift lever 33 is positioned on the outside of the main gear housing and is adapted to turn the shaft 50 to move the collar 47 back and forth on the supporting shaft 42. When the fisherman desires the spool 22 to revolve at high speed he moves the gear shift lever 33 to cause the collar 47 to slide to the right on the supporting shaft 42 and compress the spring 43. The compressed spring 43 causes the positioning finger 41 to move to the right to compress spring 44 and to move the slidable collar 37 to the right thereby causing the right face 38 thereof to mate with the left face of a large high-speed gear 51. The mating faces of the slidable collar 37 and the high-speed gear 51 have complementary projections and recessions which establish a driving engagement therebetween when the slidable collar 37 is yieldably pressed into engagement with the high-speed gear 51. The springs 43 and 44 permit the gear shift lever 33 to be moved to either one of its two positions, even though the complementary projections and recessions are not in alignment. When the alignment is effected by a small movement of the crank, the springs function to bias the collar 37 for making a full engagement between the projections and recessions. The high-speed gear 51 is connected to the worm pinion shaft 35 and floats on the solid drive shaft 34 and is rotatable with respect thereto. As the high-speed gear 51 turns due to the driving engagement with the slidable collar 37, it causes the worm pinion shaft 35 to turn.

Positioned between one side of the main gear housing 21 and the trunnion supporting leg 31 and between the enlarged end 39 of the main reel housing 21 and the worm pinion shaft 35 is the rod handle 12. The rod handle 12 is hollow and comprises two concentric tubes substantially throughout its length. (See Figure 3.) The butt end 55 of the handle 12 is adapted to be placed in a bracing socket screwed or otherwise secured to the fisherman's chair or deck of a boat or other fishing place and comprises a stationary outside tube 56 and a stationary inside tube 57. By stationary is meant that they do not rotate with respect to each other or the reel 20. The stationary outside tube 56 terminates at the cradle mounting ring or band 13 which connects the cradle arms 14 and 15 to the rod handle 12, but the stationary inside tube 57 continues from the butt end 55 to the socket or rod end of the handle 12. Around the stationary inside tube 57 and positioned between the cradle mounting ring 13 and the socket end of the handle is a turnable hollow shaft 58 having gear teeth 59 thereon. The gear teeth 59 are adapted to mesh with worm teeth 60 on the worm pinion shaft 35. From Figure 5 it will be seen that as the winding handle or crank 24 is turned a transmitting movement is transmitted through the solid shaft 34, the slidable collar 37, the high-speed gear 51, the worm pinion shaft 35 and worm teeth 60, to the turnable hollow shaft 58 which rotates with respect to the reel 20 and with respect to the stationary tube 57 of the handle 12. The turnable hollow shaft 58 is provided with an enlarged end cam 61 which is eccentric with the axis of the tube. From Figures 1 and 3 it will be noted that as the eccentric cam 61 turns inside a ring 62 which is connected by means of a link 63 to the main gear housing 21, it causes the main gear housing 21, with its attached spool 22 and friction device housing 23 to pivotally oscillate or tip back and forth thereby continually altering the position of the axis of the spool with respect to the direction from which the line 25 is being reeled in, the line being directed to the center of the spool when the axis of the spool is perpendicular to the line. Accordingly the line 25 passes from the last guide 26 on the rod 10 to the reel spool 22, and, due to the pivotal oscillation thereof, that is, tipping forward and backward of the reel with respect to the handle 12 and the rod 10, the line will wind about the spool axle 19 in a level manner. Thus during the tipping forward of the spool the line 25 will wind about the axle 19 from the bottom to the top of the axle and during the tipping backward of the spool the line 25 will wind about the axle 19 from the top to the bottom, thereby establishing uniform layers of line which are less apt to back-lash and snarl when the line is unwound from the spool at a rapid rate than line which is irregularly wound. Bearings 32 are provided between the spool wall and the main gear housing 21 to prevent expansion of the reel wall resulting from a large amount of line being tightly wound thereon.

Figure 8:
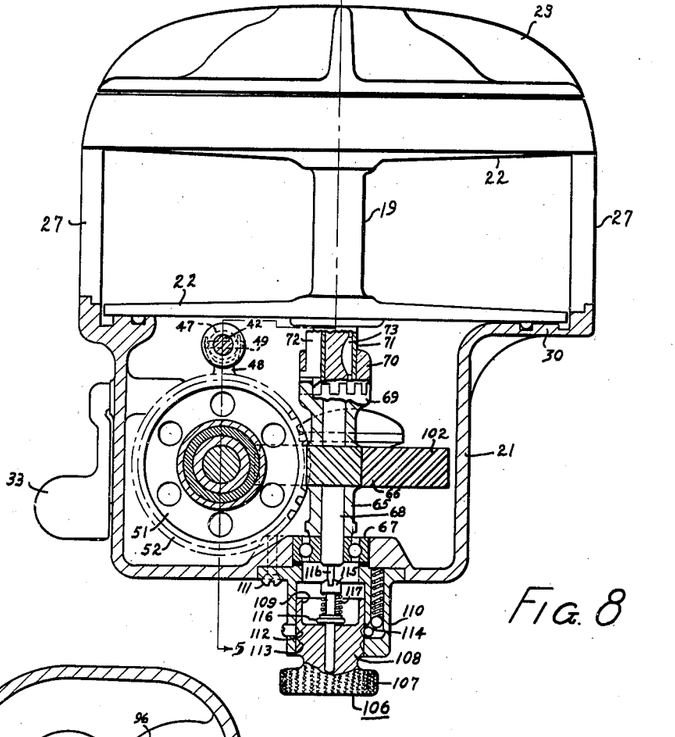
Figure 8 is a sectional view taken along line 8—8 of Figure 5 showing the spool shaft assembly through the main housing.
Figure 10:
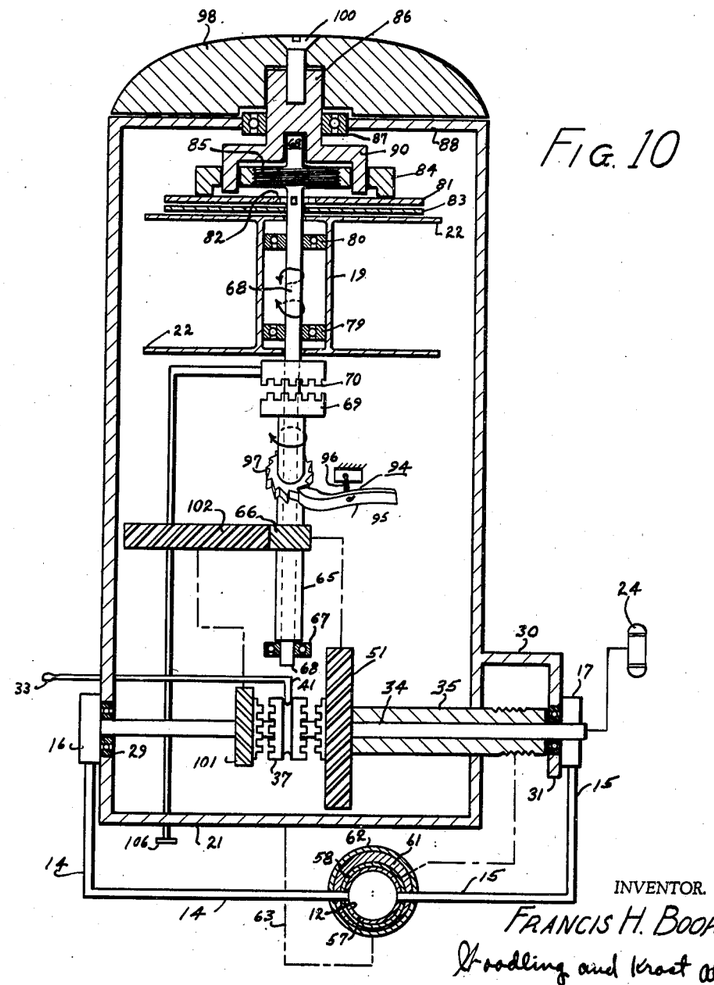
Figure 10 is a diagrammatic view partly in cross-section showing essential parts of my reel in operative association.

The high-speed gear 51 is turned by the torque action of the winding handle 24 when the right face 38 of the slidable collar 37 is in engagement with the left face of the gear 51. The common method of turning the winding handle 24 is used. That is, as viewed from the right hand side of Figure 5, a clockwise movement of the handle 24 will cause the line to be wound on the reel. As before described the high-speed gear 51 is connected to the worm pinion shaft 35 and through it the level wind action of the reel is effected. In Figures 6, 8 and 10 it will be seen that the high-speed gear 51 is also connected to drive a hollow shaft 65 by means of the teeth 52 of the high-speed gear 51 engaging the teeth 66 on the outside of the hollow shaft 65. Inside the hollow shaft 65 and journalled in a lower bearing 67 is a spool shaft 68 which is adapted to drive the spool 22. The hollow shaft 65 terminates at its upper end in an enlarged engaging clutch face 69 having projections and recessions adapted to matingly engage corresponding recessions and projections on a clutch collar 70. The clutch collar 70 is keyed to a hollow shaft 71 by means of the key 72 or other similar device to transmit torque from the clutch collar 70 to the shaft 71. The collar 70 is slidably mounted on the shaft 71 to enable it to slide up on the hollow shaft 71 to disengage the latter from the hollow shaft 65. The hollow shaft 71 is keyed to the spool shaft 68 by means of a suitable key 73 or other similar device.

The spool shaft 68 passes through the hollow spool axle 19, and is connected at its upper end to a friction device which may be adapted to operate as a frictional clutch to drive the spool 22 to wind line in and which may be operated as a frictional brake to oppose the unwinding of the line. The friction of the device may be entirely released to give free spooling. The friction of the device may also be adjusted to allow the spool 22 and the axle 19 to frictionally slip in an unwinding direction with respect to the spool shaft 68, under the spurt of a fish even though at the time the fisherman may be turning the crank 24 to wind in the fish. The value of this feature lies in playing a large fish which exerts its force away from the reel in quick spurts and which allows itself to be reeled in toward the boat between its spurts of energy away from the boat.

Fishing for game fish is done by sportsmen using a line which is not strong enough to stop a large fish while the fish is swimming away from the fisherman at a high rate of speed. To prevent the line from breaking, the fish is allowed to take line from the reel. A powerful braking force is put on the line by means of the reel and when the fish tires of his exertion from swimming away from the fisherman against the braking force on the reel, the fisherman can then reel in some of the line which was taken out by the fish. With a large and powerful fish this process of allowing the fish to take out line during his spurts of energy and reeling him in during the fish's "rest period" may be kept up for many hours. If the fish were not allowed to take line out from the reel during his spurts of energy any one of the spurts might snap the line. As the fisherman does not know just when one of these spurts of energy will take place he might be reeling in on the line when the fish decided to suddenly go away from the boat. For an instant the fisherman might not realize that the fish was exerting too much pull on his line and might continue to try to reel him in. Often this results in a broken line and the loss of a fine fish. To guard against this danger in my reel, the friction may be adjustably set between the spool shaft 68 and the spool axle 19 to compensate for sudden spurts. With my reel the fisherman can set the friction device to slip at any desired pull by the fish. Then, by turning the winding handle 24 in a forward direction, the device becomes a frictional drive and the fisherman will reel in the fish so long as the fish does not exert a force greater than that set on the friction device. When the fish does exert a greater force than that for which the friction drive is set a slippage will occur and, even though the fisherman is still turning the handle 24 and the spool shaft 68 in a forward direction to reel the fish in, the spool itself will be turning in a reverse direction under the force of the pull of the fish to allow line to play out. When this occurs, the force which is set on the friction device then becomes a drag or braking force against which the fish must exert his energy. The fisherman need not crank continuously, nor hold the crank stationary while the fish spurts away, in order to establish the frictional braking force, as a ratchet 94, which will be explained later, is employed to prevent the reverse rotation of the spool shaft 68. When the fish tires, the fisherman needs only to resume the turning of the winding handle 24 to pull the fish in. It will be seen therefore that the fisherman using my reel does not need to throw a lever, push a button, or set a brake every time the fish decides to swim away from the boat, nor does the fisherman have to throw off a brake, reset a lever, or pull a button when he decides to reel the fish in.

Figure 5:
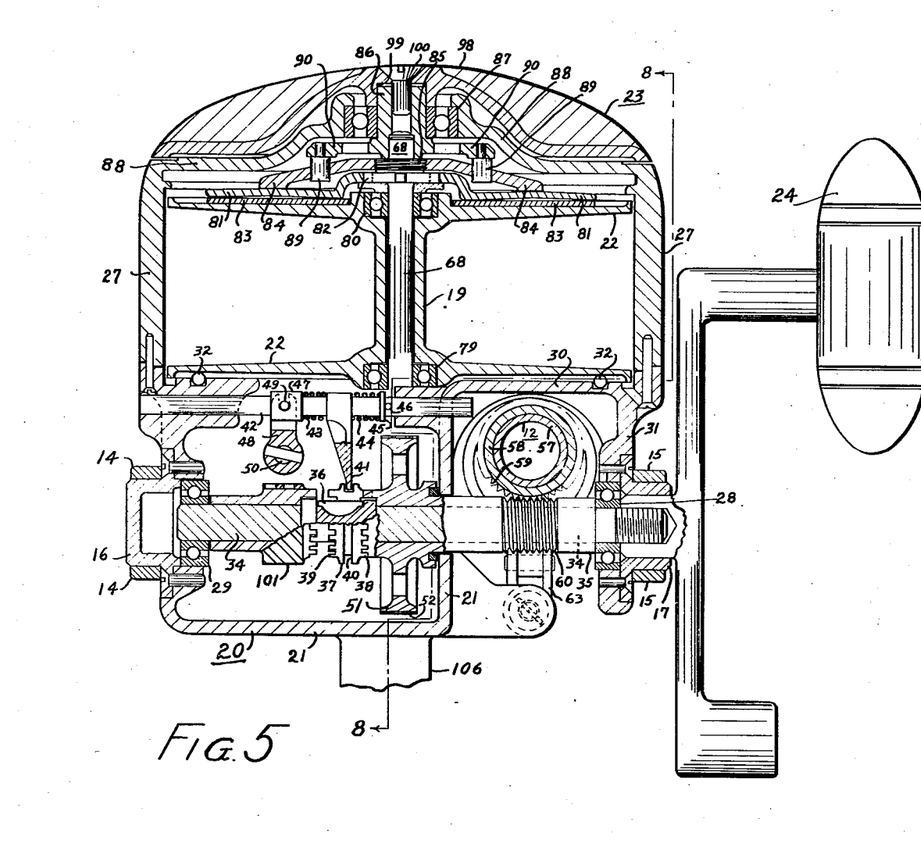
Figure 5 is a sectional view taken along line 5—5 of Figure 8 and having small portions in broken-section to show certain parts more clearly, and to illustrate particularly the crank shaft and brake assembly.
Figure 6:
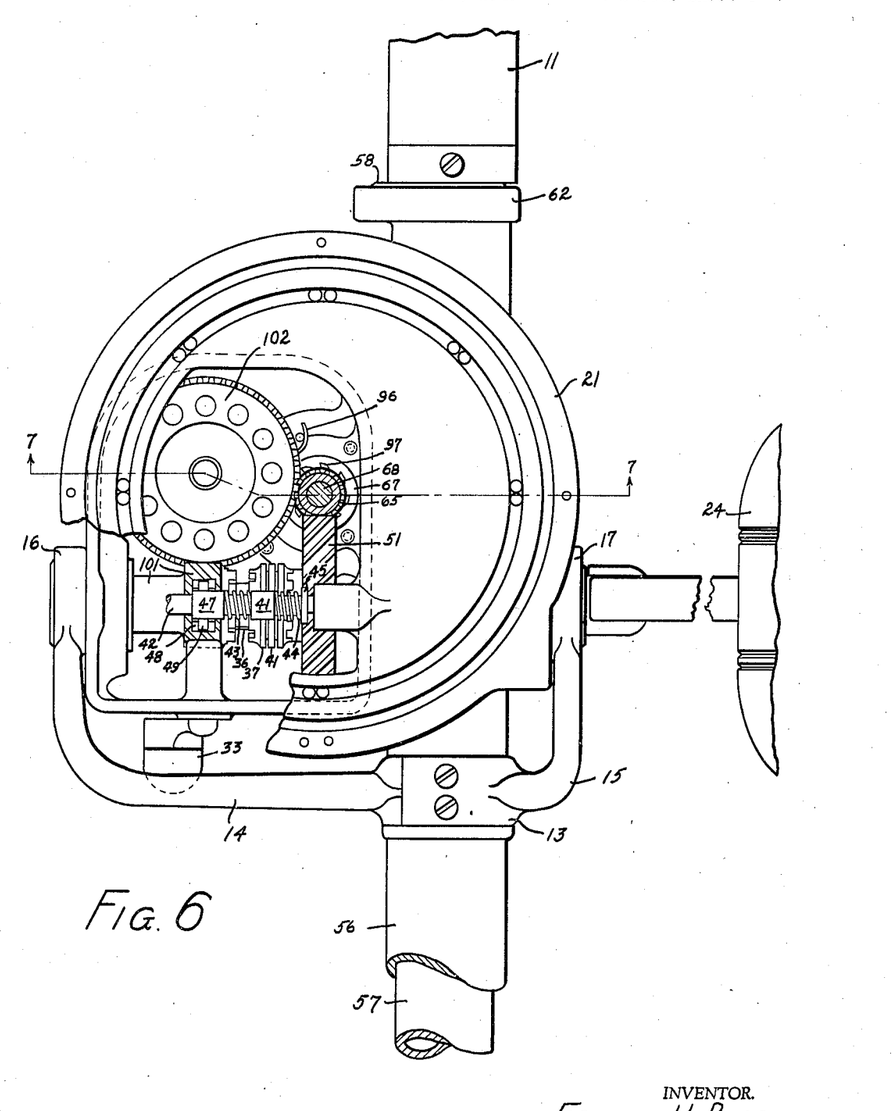
Figure 6 is a plan view showing the main housing assembly with the break mechanism and reel spool removed.

The friction device which comprises the friction drive and the brake drag is controlled in the brake housing 23 and may be seen in detail in Figure 5. The spool shaft 68 which turns in the lower bearing 67 (Figure 8), the middle bearings 79 and 80, and a top bearing 87, is keyed to a circular pressure plate 81 by means of radially spaced external teeth engaging internal mating teeth in the pressure plate at spaced circumferential points 82, see Figures 5 and 10. Between the pressure plate 81 and the wall of the spool 22 there is a circular friction brake lining disc 83. Due to the fact that the pressure plate 81, the brake lining disc 83 and the walls of the spool 22 are circular a large area of braking surface is obtained. This is important, not only from the fact that a powerful frictional driving force and a powerful braking force may be exerted but also from the fact that a large area is provided for giving long wear.

A pressure adjustment plate 84 is threadably and adjustably attached to an enlarged and threaded portion 85 of the spool shaft 68. The pressure adjustment plate 84 is engaged by four pins 89 (only two of which are shown) held by the disc 90 which is integral with a hollow square shaft 86. The hollow square shaft is positioned around the upper end of the spool shaft 68 and is adapted to be turned with respect thereto upon adjusting the friction against the spool. The bearing 87 is positioned between the hollow square shaft 86 and a stationary plate 88. The stationary plate 88 is integral with the four legs 27 which extend between the main gear housing 21 and the friction housing 23 and serves to attach the friction mechanism to the main gear housing. The upper end of the spool shaft 68 is journaled in the circular hollow portion of the square shaft 86 and the outside of the square shaft 86 is bearinged in the bearing 87. When line is being wound upon the spool 22, the spool shaft 68 turns in a counter-clockwise direction, as seen from below, on bearings 67 and 87. When winding in the line, the middle bearings 79 and 80 do not function as both the spool shaft 68 and the spool axle 19 turn at the same speed. The reason that the upper bearing 87 turns when winding the line in is that the spool shaft 68 is keyed to the pressure plate 81 which is adapted, when the friction is set, to turn with the brake lining 83, the spool wall, and the pressure adjustment plate 84 pinned to the disc 90 which turns within the bearing 87.

Figure 7:
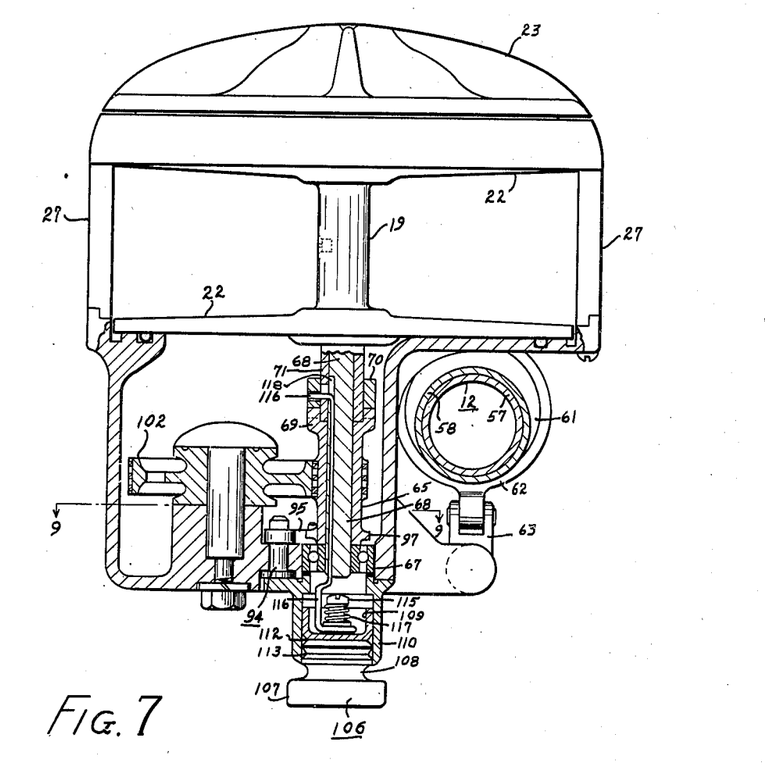
Figure 7 is a side view of the reel spindle and a sectional view of the main housing taken along line 7—7 of Figure 6 and showing the spool shaft, ratchet, and idler gear assembly.
Figure 9:
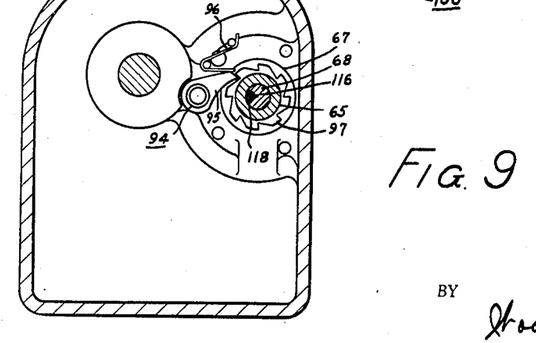
Figure 9 is a sectional view taken along line 9—9 of Figure 7 and showing the ratchet and spring assembly.

A ratchet is provided to prevent the spool shaft from turning backward due to the force of a fish swimming away from the fisherman. The ratchet, indicated generally by the reference character 94, is best seen in Figures 7, 9 and 10 and comprises a dog 95 biased by a spring 96 to engage teeth 97 attached to the hollow shaft 65 in such a manner that the hollow shaft can turn only in the direction to wind fishing line in. Due to the fact that the hollow shaft 65 will not turn backwards, the spool shaft 68 which is keyed to the hollow shaft 65 does not turn backward on the upper bearing 87 when a fish is unwinding line from the reel. When a fish in a burst of energy exerts a force greater than that for which the frictional device is set, a slippage occurs in the frictional drive between the wall of the reel spool 22 and the pressure plate 81, and the reel spool is turned backward or in an unwinding direction under the influence of the pull of the fish to allow line to unwind from the spool. The spool turns on the middle bearings 79 and 80 when the fish is going away from the reel. At that time the frictional drive becomes a frictional drag or brake and the reel spool axle 19 turns on the bearing 79 as its lower bearing and on the bearing 80 as its upper bearing. Due to the fact that the spool turns on bearings 79 and 80 and that the spool shaft 68 does not turn, during the unwinding of the line, the level-wind is inactive. That is, the level-wind does not operate in reverse when line is being taken away from the reel. Accordingly the danger of the line becoming tangled is kept at a minimum.

The frictional force at which slippage occurs is adjustable by turning an outside cover plate 98. The cover plate has a hollow square core portion 99 which is adapted to engage the top part of the hollow square shaft 86 to which it is attached by a screw 100. The turning of the cover plate 98 and the disc 90 in a clockwise direction as viewed from the top, screws the pressure adjustment plate 84 down against the pressure plate 81 and adjusts the force which the frictional device exerts. More specifically, the turning of the cover plate 98 turns the hollow square shaft 86, the disc 90, the pins 89, and the pressure adjustment plate 84 with respect to the spool shaft 68. As the pressure adjustment plate 84 threadably engages the threaded portion 85 of the spool shaft 68, it moves the pressure adjustment plate 84 with respect to the spool shaft 68 and thereby changes the pressure which the pressure adjustment plate 84 transmits to the pressure plate 81, to the brake lining 83, and to the spool wall.

As hereinbefore pointed out, my reel is provided with a high-speed and a low-speed for transmitting torque from the winding handle 24 to the spool 22. The high-speed gear 51 has already been described. The low-speed gear is indicated by the reference character 101, see Figure 5. The low-speed gear floats on the solid shaft 34 which is turned by the winding handle 24 to cause the slidable collar 37 which is keyed to the shaft 34 to turn. The slidable collar has clutch faces 38 and 39 which are adapted respectively to engage the high-speed gear 51 and the low-speed gear 101 and cause the gears to turn. Figure 5 shows the clutch face 38 in driving engagement with a mating face on the high-speed gear 51. The gear shift lever 33 which is mounted on the outside of the main gear housing 21 is adapted to shift the slidable collar 37 from engagement with the high-speed gear 51 to engagment with the low-speed gear 101 by means of the spring biased positioning finger 41.

When the left clutch face 39 of the slidable collar 37 is in driving engagement with the mating clutch face of the slow-speed gear 101, the transmission of power is from the winding handle 24 to the solid shaft 34, to the slidable collar 37, to the slow-speed gear 101, and then to the gear 102 with which the slow-speed gear 101 is in driving engagement and which is shown in Figure 8. The gear 102 is in driving engagement with the hollow shaft 65 which in turn is in driving engagement with the spool shaft 68 by means of the clutch collar 70 which is keyed to the spool shaft 68. The two speed arrangement provides a speed range to accommodate a wide variation of speed conditions.

To disconnect the spool 22 from as much of the internal or gear friction of the reel as possible and to thereby effect free spooling, I provide a push button 106 which slides the clutch collar 70 up on the shaft 71 and breaks the driving engagement between the hollow shaft 65 and the spool shaft 68. With the connection between the hollow shaft 65 and the spool shaft 68 broken, the ratchet 94 no longer prevents the spool shaft 68 from rotating backwards and accordingly the spool 22 is free to rotate on bearings 67 and 87 in a reverse or unwinding direction under the force of the fish pulling out the line. Because of the disengagement from the hollow shaft 65 with its gear connection to the turnable hollow shaft 58, the level-wind is arrested. That is the axis of the spool 22 does not pivotally oscillate with respect to the line when the line is unwinding. Accordingly, it will be seen that my reel provides a level-wind which does not embody any device which might tangle or wear the line as it is taken out rapidly. This feature of releasing the reel spool to allow it to rotate freely is known variously as free-wheeling or free-spooling. The free-spooling is effected by the fisherman striking the button 16 with his hand. The button 106 is conveniently mounted on the bottom of the main gear housing 21 where the fisherman can strike it without having to look for it. Figures 7 and 8 illustrate the action which takes place when the button 106 is pushed upward. The button comprises a button head 107 integrally connected to a circular shaft 108 having a hollow portion 109. The circular shaft 108 is adapted to slide within a circular casing 110 which is attached to the bottom of the main gear housing 21 by means of screws 111 or other suitable attaching means. The circular shaft 108 has two circumferential grooves 112 and 113 around it which are adapted to cooperate with a spring biased ball bearing 114 mounted in the circular casing 110 to retain the button 106 in either of two selective positions. The groove 112 cooperates with the ball bearing 114 to hold the button in its downward or engaging position and the groove 113 cooperates with the ball bearing 114 to hold the button in its upward or free-spooling position. Connected to the circular shaft 108 within the hollow portion 109 by means of a screw 115 is an actuating rod 116. A spring 117 is positioned between the head of the screw 115 and the actuating rod 116 but because of a shoulder on the shaft of the screw 115, the spring does not frictionally bias the rod 116 against the circular shaft 108. The actuating rod 116 passes up a groove 118 in the spool shaft 68 and engages the clutch collar 70. A push on the button 106 causes the actuating rod 116 to disengage the clutch collar 70 from the mating clutch face 69 on the hollow shaft 65. A pull on the button 106 causes the spring 117 to bias the clutch collar 70 against its mating clutch face 69. The spring biased engagement between the two mating clutch faces permits the button 106 to be pulled down even though the projections and recessions of the mating clutch collars 69 and 70 do not register as of the time of the actuation of the button 106, the registration being subsequently effected upon the turning of one collar with respect to the other under the biasing of the spring 117. Due to the fact that the spring 117 does not bias the actuating rod 116 against the circular shaft 108, the end of the actuating rod 116 which is looped around the screw 115 is free to rotate as the spool shaft 65 turns. Therefore, upon hooking a large fish which pulls out on the line, and upon the free-spooling button 106 being hit to disengage the hollow shaft 65 from the spool shaft 68, the spool 22 turns under the pull of the fish on bearings 67 and 87 and is relatively free of reel drag or gear friction.

When a condition arises to discontinue free-spooling and apply a braking action to the spool, this may be done by pulling down the button 106 and then turning the outside cover plate 98 of the brake housing 23 in a direction to produce the desired braking action. A turn of the cover plate 98 causes the pressure adjusting plate 84 to bear against the pressure plate 81 with increased pressure and thereby increase the frictional force between the wall of the spool 22 and the frictional brake lining 83.

From Figures 5 and 6 it will be seen that the level-wind is always driven at a speed which is proportional to the amount of line which is being wound on the spool 22. If the pivotal oscillation of the reel spool 22 were not in proportion to the amount of line which was being wound thereon, the line would not lie in even layers about the axle, but would tend to bunch up or leave spaces between the turns about the axle, depending upon whether there was too much line or too little line being wound about the axle for each cycle of the level-wind mechanism. As has been heretofore explained, the line is wound on the spool axle 19 in a regular and orderly manner by pivotally oscillating the reel with respect to the incoming line. The reel is pivotally oscillated by the eccentric end of the turnable hollow shaft 58 turning inside the ring 62 which is connected to the main gear housing 21. The worm pinion shaft 35 turns the rotatable tube 58 and the speed with which the turnable hollow shaft 58 turns governs the frequency with which the reel goes through its pivotal oscillations. As the high-speed gear 51 is connected to the worm pinion shaft 35, the shaft 35 turns at the same speed as the high-speed gear 51. Inasmuch as the gear 51 is continuously in mesh with the gear 66 on the hollow shaft 65, which rotates in accordance with speed of the driven spool 22, it follows that the gear 51 likewise rotates in direct proportion to the speed of the driven spool, regardless whether the speed gear shift lever 33 is set in the high-speed or low-speed position. Therefore, the cycle of the pivotal oscillations of the level-wind mechanism is proportional to the speed of rotation of the driven spool.

Figure 3:
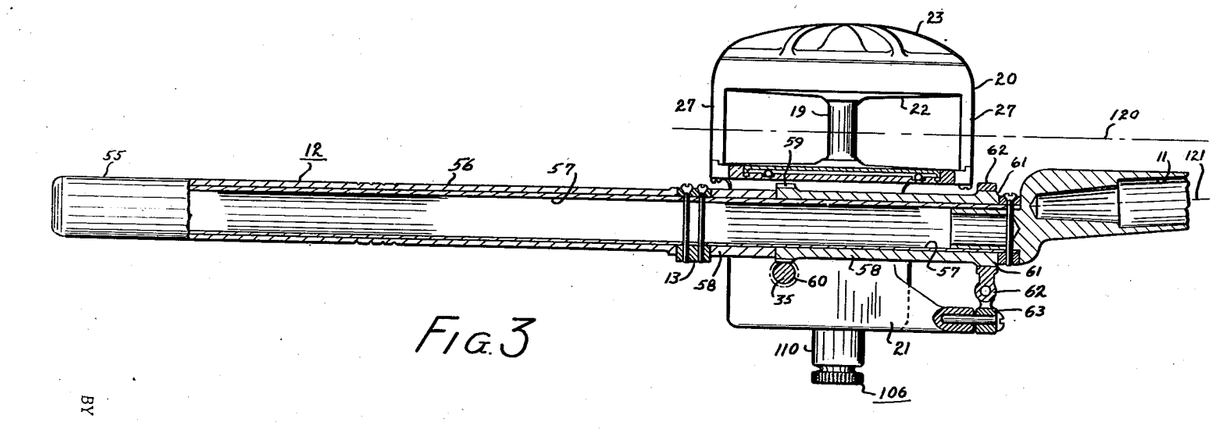
Figure 3 is a side view of my reel and rod handle showing the eccentric connection therebetween which causes the line to be wound on the reel spool in layers.
Figure 4:
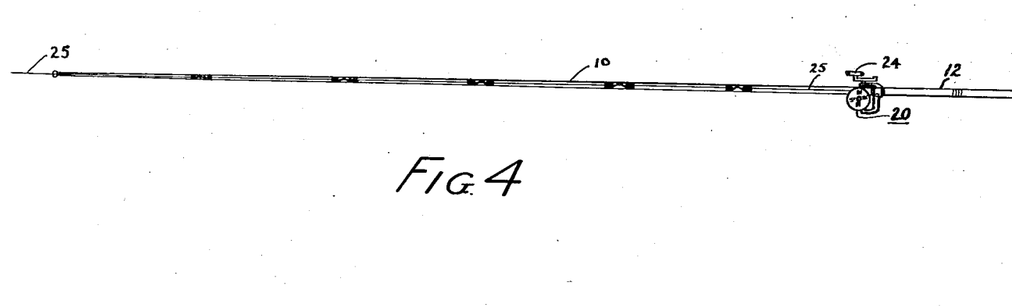
Figure 4 is a top view of my reel, rod handle, and pole.

To assure that the line which winds on the reel spool 22 does so in the proper manner to prevent back-lash when the line is taken out quickly several factors must cooperate. Figures 3 and 4 best illustrate these factors. To achieve my level-wind action I pivotally oscillate my reel spool 22 forward and backward with respect to the rod 10 and the line 25. The amount of tilting oscillation must not be too much with respect to the amount of line which is wound about the spool axle 19, or the successive turns of line about the axle which comprise a layer of line will have spaces between them which increase the danger of back-lash. The amount of tilting or pivoting must not be too little or the successive turns of line about the axle 19 will fall on top of each other. The best manner in which the line can be placed about the axle is for the line to wind about the axle from the bottom side wall to the top side wall in a smooth layer and with no open spaces between adjacent turns of the line. The next layer then lies on top of the first in a smooth layer from the top side wall to the bottom side wall. If the turns of the line about the axle are close enough together the turns of the top layer will not press in between two adjacent turns of the layer underneath it.

With these dimensions disclosed and from the fact that Figures 5, 6, 7, 8, and 9 are substantially full size and Figure 3 is substantially half-size, a reel may be readily constructed embodying my invention.

In summation, and as can best be seen from the diagrammatic drawing in Figure 10, my invention comprises, generally, a driving means for rotating the spool 22 at two different speeds, in which there are two clutches in series with the transmission of the driving power to the spool. The first clutch comprises the mating parts 69 and 70 and the second clutch comprises the friction device. Free-spooling may be effected either by disengaging the parts 69 and 70 or by separating the frictional parts of the frictional device. Under free-spooling, the hollow shaft 65 is prevented from rotating by the ratchet 94 and thus the pivotal oscillations of the spool are arrested or inactive, since no power is transmitted to the eccentric 61. The frictional device functions as a drag upon the spool when the parts 69 and 70 are mating and when the line is being withdrawn from the spool, as the ratchet prevents the spool shaft 68 from turning in a reverse direction and in order that the spool may unwind, slippage takes place in the frictional device. The frictional device acts as a frictional driving clutch upon the rotation of the crank 24, under which condition the friction may be adjusted to produce any winding torque upon the spool. As the crank 24 is turned power is transmitted to the eccentric 61 which pivotally oscillates the spool to effect level-wind. Thus, the level-wind mechanism is driven by the driving means in advance of the first clutch.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A reel comprising, in combination, a spool mounted for pivotal-oscillating movement to effect level-wind, driving means for rotating said spool, said driving means having a first portion and a second portion, an adjustable friction device between the second driving portion and the said spool, a disengaging device between the first and second driving portions, and means actuated by the first driving portion for pivotally oscillating said spool to effect level-wind.

2. A reel comprising, in combination, a spool mounted for pivotal-oscillating movement to effect level-wind, driving means for rotating said spool, said driving means having a first portion and a second portion, an adjustable friction device between the second driving portion and the said spool, a disengaging device between the first and second driving portions, means actuated by the first driving portion for pivotally oscillating said spool to effect level-wind, and ratchet means to prevent rotation of the first driving portion in one direction.

3. A reel comprising, in combination, a spool mounted for pivotal-oscillating movement to effect level-wind, driving means having a plurality of speed arrangements for rotating said spool at changeable speeds, said driving means having a first portion and a second portion, an adjustable friction device between the second driving portion and the said spool, a disengaging device between the first and second driving portions, means actuated by the first driving portion for pivotally oscillating said spool to effect level-wind, and ratchet means to prevent rotation of the first driving portion in one direction.

4. A reel comprising, in combination, a spool mounted for pivotal-oscillating movement to effect level-wind, means for pivotally oscillating the spool to effect level-wind upon the rotation of the spool in one direction to wind a line thereon, means for arresting the pivotal-oscillations of the spool upon the rotation of the spool in the opposite direction to unwind a line therefrom, and driving means having a plurality of speed arrangements for rotating said spool at changeable speeds.

5. A reel comprising, in combination, a spool mounted for pivotal-oscillating movement to effect level-wind, means for pivotally oscillating the spool to effect level-wind upon the rotation of the spool in one direction to wind a line thereon, means for arresting the pivotal-oscillations of the spool upon the rotation of the spool in the opposite direction to unwind a line therefrom, driving means having a plurality of speed arrangements for rotating said spool at changeable speeds, and means to make the pivotal-oscillations of the spool to be substantially proportional to the changeable rotational speeds of the spool.

6. A reel comprising, in combination, a spool mounted for pivotal-oscillating movement to effect level-wind, driving means for rotating said spool, said driving means having two clutch devices in series, and means actuated by the driving means in advance of the clutch devices for pivotally oscillating said spool to effect level-wind.

7. A reel comprising, in combination, a spool mounted for pivotal-oscillating movement to effect level-wind, driving means for rotating said spool, said driving means having two clutch devices in series, and means actuated by the driving means in advance of the clutch devices for pivotally oscillating said spool to effect level-wind, one of said clutch devices comprising a positive engagement arrangement and the other comprising a frictional engagement arrangement.

8. In a rod and reel adapted for winding in line, a handle for said rod, cradle arm means extending away from said rod handle, a line spool pivotally connected to said cradle arm means, means for rotating the said line spool to cause the line to be wound thereon and means for pivotally oscillating the line spool with respect to the rod to cause said line which is being wound thereon to be level wound.

9. A reel for winding in line comprising, in combination, a handle, a line spool having an axis substantially perpendicular to the direction of the said line, means to connect the said spool to the said handle for pivotal oscillation, means for rotating said line spool to cause the line to be wound thereon and eccentric means for pivotally oscillating the axis of the line spool with respect to the direction of the said line to cause said line which is being wound on the line spool to be level wound.

10. A reel for winding in line comprising, in combination, a reel spool having an axis of rotation which is pivotally oscillatable with respect to the line being wound thereon, selectable gears for rotating said spool to wind in line at different speeds, and means for pivotally oscillating the axis of rotation of said spool with a cyclic motion to cause said line to be level wound on the spool, said pivotal oscillating means being connected to said selectable gears to coordinate the speed of revolution of the said spool with the speed of the said cyclic motion.

11. A rod and reel construction comprising, in combination, a rod, a turnable hollow shaft about said rod, cradle arm means attached to said rod, a reel pivotally mounted upon said cradle arm means, said turnable hollow shaft having an eccentric end connection between it and said reel, and means for rotating said hollow shaft to cause said eccentric connection with said reel to oscillate said reel with respect to said rod.

12. A rod and reel construction comprising, in combination, a rod, a reel pivotally connected to said rod, eccentric means, a turnable hollow shaft about said rod and connected through said eccentric means to said reel, and winding means for causing line to be wound on said reel, said winding means also adapted to turn said hollow shaft to cause said eccentric connection between said hollow shaft and said reel to pivotally oscillate said reel with respect to said rod to cause said line to be level wound on said reel.

13. A level-wind reel construction comprising, in combination, a rod, a reel housing pivotally connected to said rod, a reel spool connected to said reel housing, high-speed gear means in said housing, low-speed gear means in said housing, a winding handle, means for selectively operating said reel spool through said high-speed gear or through said low-speed gear, eccentric means connected to said rod and to said reel housing for pivotally oscillating said reel with respect to said rod, means connecting said eccentric means to said high-speed gear and means connecting said eccentric means to said low-speed gear to cause said reel to pivotally oscillate with respect to the said rod at a high speed when said high-speed gear is turning said reel spool and at a low speed when said low-speed gear is turning said reel spool.

14. A level-wind fishing reel comprising, in combination, a spool for winding fishing line thereon, gear means for selectively rotating said spool at a plurality of speeds to cause line to be wound thereon, means for turning said gears, level wind means actuated through the selected gear means for pivotally oscillating the spool with respect to the line which is being wound thereon to cause said line to be level wound on the said spool and means for rendering said level wind means inoperative as said line is being unwound from the said spool.

15. A level-wind fishing reel comprising, in combination, a reel spool having a hollow axle upon which fishing line is adapted to be wound, a spool shaft through said hollow spool axle, first bearing means for said spool shaft, second bearing means positioned between said spool shaft and said hollow spool axle, driving means connected to said spool shaft to cause said reel spool to rotate on said first bearing means to wind fishing line on said reel spool, means connected to said spool shaft to pivotally oscillate said reel spool with respect to the line being wound thereon to cause said line to be level wound, and means for causing said reel spool to rotate on said second bearing means as line is being unwound from the said spool thereby rendering the said pivotally oscillating means inoperative as line is being unwound.

16. A level-wind reel comprising, in combination, a rod, a reel housing, cradle arms connected to said rod and rotatably attached to said reel housing, a turnable hollow shaft around said rod, eccentric means for connecting said turnable hollow shaft to said reel housing, a reel spool connected to said reel housing, first gear means in said reel housing adapted to turn said reel spool at a first speed, second gear means in said reel housing adapted to turn said reel spool at a second speed, a winding handle, clutch means for selectively connecting said winding handle to said reel spool through either the said first or the said second gear means, means for turning said turnable hollow shaft at a speed dependent upon the selection of the first or second gear means, said turnable hollow shaft through said eccentric connection with the said reel housing pivotally oscillating the said reel spool with respect to the line being wound thereon to cause the line to be level wound.

17. A level-wind fishing reel comprising, in combination, a reel spool, a spool shaft for turning said reel spool to cause line to be wound thereon, an eccentric means in engagement with said reel spool to pivotally oscillate said reel spool to cause said line to be level wound thereon, a winding handle, a winding shaft connected to said winding handle and adapted to turn as said winding handle turns, first speed gear means floating on said winding shaft and in engagement with said spool shaft and in engagement with said eccentric means, second speed gear means floating on said winding shaft and in engagement with said spool shaft and in engagement with said eccentric means through said first speed gear means, clutch means for selectively connecting said winding shaft to said first speed or second speed gear means to cause said spool shaft and said reel spool to turn, said clutch means also connecting said winding shaft to said reel spool through said eccentric means to cause said eccentric means to pivotally oscillate said reel spool at a speed in proportion to the speed at which the reel spool is turned by said first or second-speed gear means.

18. A fishing reel comprising, in combination, a reel spool rotatable in a first direction to wind line thereon and rotatable in a second direction under an external pull to cause line to be unwound therefrom, gear means in engagement with said spool for rotating said spool in said first direction selectively at a plurality of winding speeds, spool tilting means for enabling the spool to be pivotally oscillated with respect to the line, said gear means also engaging said spool tilting means for pivotally oscillating said spool at a speed in proportion to the winding speed, and means for disengaging said gear means from said spool and from said spool tilting means to cause said spool to freely rotate without pivotally oscillating in said second direction.

19. A reel having a free-spooling device comprising, in combination, a reel spool rotatable in a first direction to wind line thereon and rotatable in a second direction under a pull from outside of the reel to cause line to be unwound therefrom, a shaft for turning said reel spool, a winding handle, clutch means between said winding handle and said shaft for connecting said winding handle to said shaft to cause said reel spool to turn with said winding handle, level-wind means connected to said winding handle and to said reel spool to cause said reel spool to move when said winding handle is turned, and means for actuating said clutch means for disconnecting said winding handle and said shaft to give free-spooling.

20. A level-wind reel construction comprising, in combination, a rod, a reel housing pivotally connected to said rod, a reel spool connected to said reel housing, high-speed gear means in said housing, low-speed gear means in said housing, gear shift means mounted on the outside of said housing and adapted to selectively connect said high and low-speed gear means to said reel spool, a winding handle for turning said reel spool through either the said high or low-speed gears, eccentric means connected to said rod and to said reel housing for pivotally oscillating said reel with respect to said rod, means connecting said eccentric means to said high-speed gear and means connecting said eccentric means to said low-speed gear to cause said reel to be pivoted with respect to the said rod at a high speed when said high speed gear is turning said reel spool and at a low speed when said low-speed gear is turning said reel spool.

21. A level wind construction comprising, in combination, a rod, a reel spool pivotally connected to said rod, gear means comprising high-speed and low-speed gears for driving said reel spool at selective speeds, a winding handle adapted to turn said gear means to cause said reel spool to rotate to wind line thereon, eccentric means for pivotally oscillating said reel spool to cause said line being wound thereon to be level-wound, said eccentric means being connected to said gear means and adapted to pivotally oscillate said reel spool at a speed in proportion to the turning speed of the said reel spool.

22. A reel comprising, in combination, a rotatable and pivotally oscillatable reel spool, gear means comprising high and low-speed gears, a winding handle adapted to rotate said reel spool at selective speeds through said high and low-speed gear, and eccentric means for pivotally oscillating said reel spool, said eccentric means operating through said gear means to proportion the speed of pivotal oscillations of said reel spool with the speed of rotation thereof.

23. A reel for winding line comprising, in combination, a spool, means for rotating said spool in a forward direction to cause line to be wound thereon, eccentric means connected to said spool and connected to said rotating means to pivotally oscillate said spool as said spool is rotated in a forward direction by the said rotating means to cause the line being wound thereon to be level-wound, said spool being rotatable in a reverse direction by an external pull on the said line to cause line to be unwound therefrom, and means for rendering said eccentric means inoperative as said spool turns in said reverse direction.

24. A rod and reel comprising, in combination, a reel housing pivotally connected to said rod, a spool mounted in said housing, crank means connected to said spool for rotating said spool in a forward direction to cause line to be wound thereon, eccentric means connected to said reel housing and to said winding means for pivotally oscillating said reel housing and said spool as said winding means rotates said spool in a forward direction to cause the line which is being wound thereon to be level wound, said spool being rotatable in a reverse direction by an external pull on said line to cause the line to be unwound therefrom, and means for rendering said eccentric means inoperative to pivotally oscillate said housing and said spool in a reverse direction.

25. A rod and reel comprising, in combination, a reel housing pivotally connected to said rod, a spool connected to said reel housing, winding means extending through the pivotal connection between said reel housing and said rod for rotating said spool to cause line to be wound thereon, eccentric means connected to said winding means and connected to said reel housing to pivotally oscillate said reel housing and said spool with respect to the said rod and with respect to said winding means to cause the line which is being wound thereon to be level wound.

26. A rod and reel comprising, in combination, a reel housing pivotally connected to said rod, a spool connected to said reel housing, winding means extending through the pivotal connection between said reel housing and said rod for rotating said spool to cause line to be wound thereon, a rotatable tube around said rod and connected to said winding means to cause said rotatable tube to turn with respect to the said rod as said winding means is turned, eccentric means connected to said rotatable tube and connected to said reel housing to pivotally oscillate said reel housing and said spool with respect to the said rod and with respect to said winding means to cause the line which is being wound thereon to be level wound.

27. A rod and reel comprising, in combination, a spool pivotally mounted on said rod, winding means for rotating said spool to wind line thereon, and eccentric means actuated by said winding means and connected to said spool for pivotally oscillating said spool to cause the line which is being wound thereon to be level wound.

28. A reel comprising, in combination, a spool for winding line thereon, driving means operable about an axis for rotating said spool, pivotal means to mount the spool for pivotal oscillation about the axis of the driving means, said driving means having a first portion and a second portion, said second driving portion connected to rotate said spool, a disengaging device between the first and second driving portions to effect free-spooling of the spool, and means actuated by the first driving portion to pivotally oscillate said spool to effect level-wind.

29. A reel comprising, in combination, a spool for winding line thereon, driving means operable about an axis for rotating said spool, pivotal means to mount the spool for pivotal-oscillation about the axis of the driving means, transmitting means actuated by the driving means to pivotally oscillate said spool to effect level-wind, and means to disconnect the spool from the driving means for effecting free-spooling and for arresting the transmitting means.

30. A reel comprising, in combination, a spool for winding line thereon, driving means operable about an axis for rotating said spool, pivotal means to mount the spool for pivotal-oscillation about the axis of the driving means, transmitting means actuated by the driving means to pivotally oscillate said spool to effect level-wind, upon the rotation of the spool in one direction to wind the line thereon, and means for arresting the pivotal-oscillations of the spool upon the rotation of the spool in the opposite direction to unwind the line therefrom.

31. In a rod and reel adapted for winding in line, a handle for said rod, cradle arm means attached to said rod, a spool for winding line thereon mounted in the cradle arm means, driving means operable about an axis for rotating said spool to cause the line to be wound thereon, pivotal means to mount the spool for pivotal-oscillation on the cradle arm means about the axis of the driving means, and means actuated by the driving means to pivotally oscillate said spool with respect to the rod to cause said line which is being wound thereon to be level wound.

32. A reel comprising, in combination, a spool for winding line thereon, driving means operable about an axis for rotating said spool, pivotal means to mount the spool for pivotal-oscillation about the axis of the driving means, and radially varying means actuated by said driving means and connected to said spool for pivotally oscillating said spool to cause the line which is being wound thereon to be level wound.

33. A reel comprising, in combination, a spool for winding line thereon, driving means operable about an axis for rotating said spool, pivotal means to mount the spool for pivotal-oscillation about the axis of the driving means, and recurrent means actuated by said winding means and connected to said spool for pivotally oscillating said spool to cause the line which is being wound thereon to be level wound, said recurrent means producing a translatory movement to effect the pivotal oscillations of the spool.

34. A rod and reel comprising, in combination, a spool for winding line thereon, a housing for the spool, bearing means for pivotally mounting the housing on the rod about an axis which is substantially perpendicular to the rod, means for rotatively mounting the spool on the housing about an axis which is substantially perpendicular to both the rod and the pivotal axis of the bearing means, driving means for rotating said spool, and means actuated by the driving means to pivotally oscillate the housing about the bearing means and thereby pivotally oscillate the spool with respect to the rod to cause the line which is being wound thereon to be level wound.

35. A reel comprising, in combination, a spool for winding line thereon, driving means operable about an axis for rotating said spool, pivotal means to mount the spool for pivotal-oscillation about the axis of the driving means, and transmitting means actuated by the driving means to pivotally oscillate said spool to effect level-wind.

FRANCIS H. BOOR.